Figure 1:
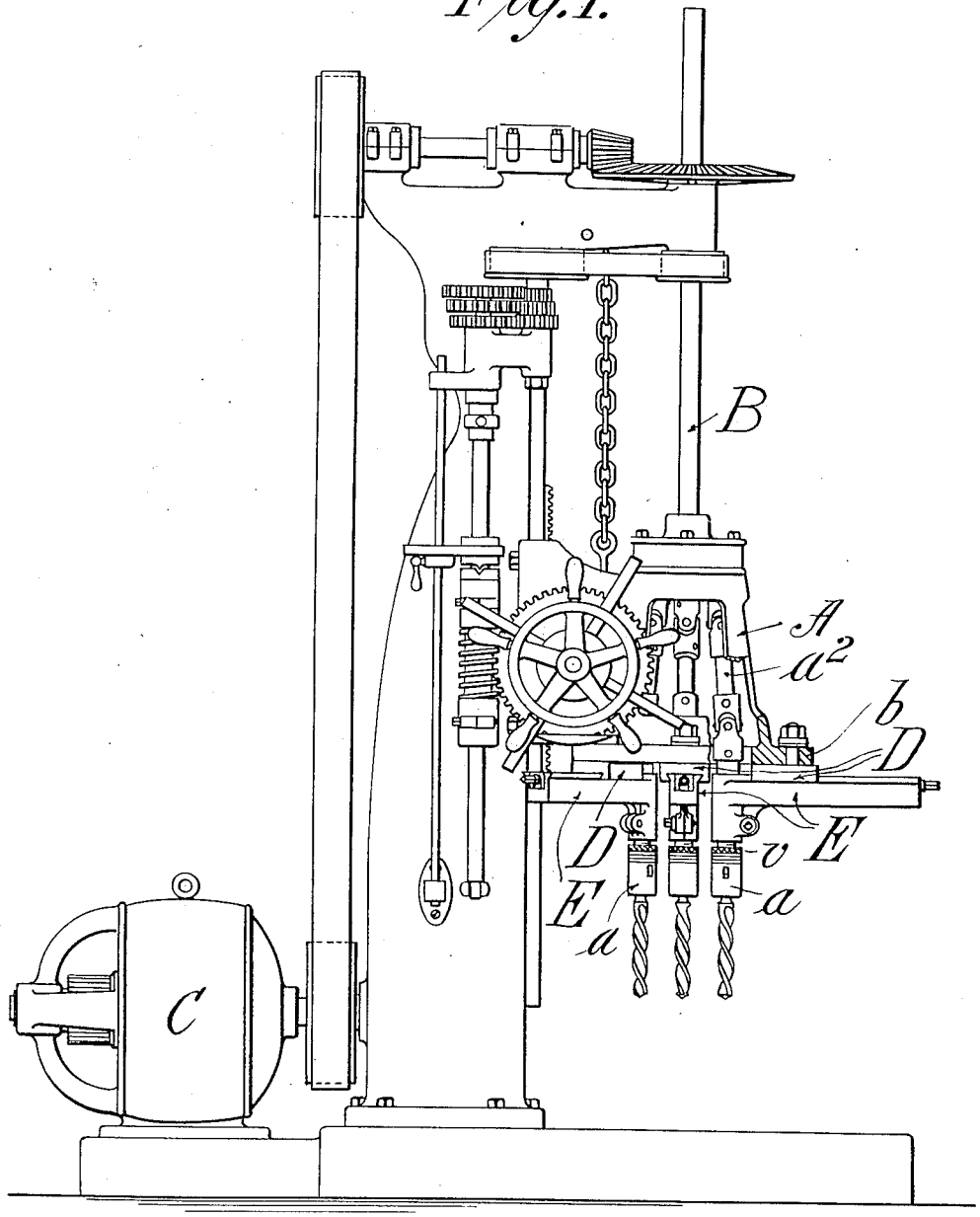

F. E. BOCORSELSKI.
METAL WORKING MACHINE.
APPLICATION FILED MAR. 23, 1908.

904,926.

Patented Nov. 24, 1908.
2 SHEETS—SHEET 1.

WITNESSES:
H. L. Sprague
R. M. Mowry

INVENTOR,
Frank E. Bocorselski
BY
ATTORNEY.

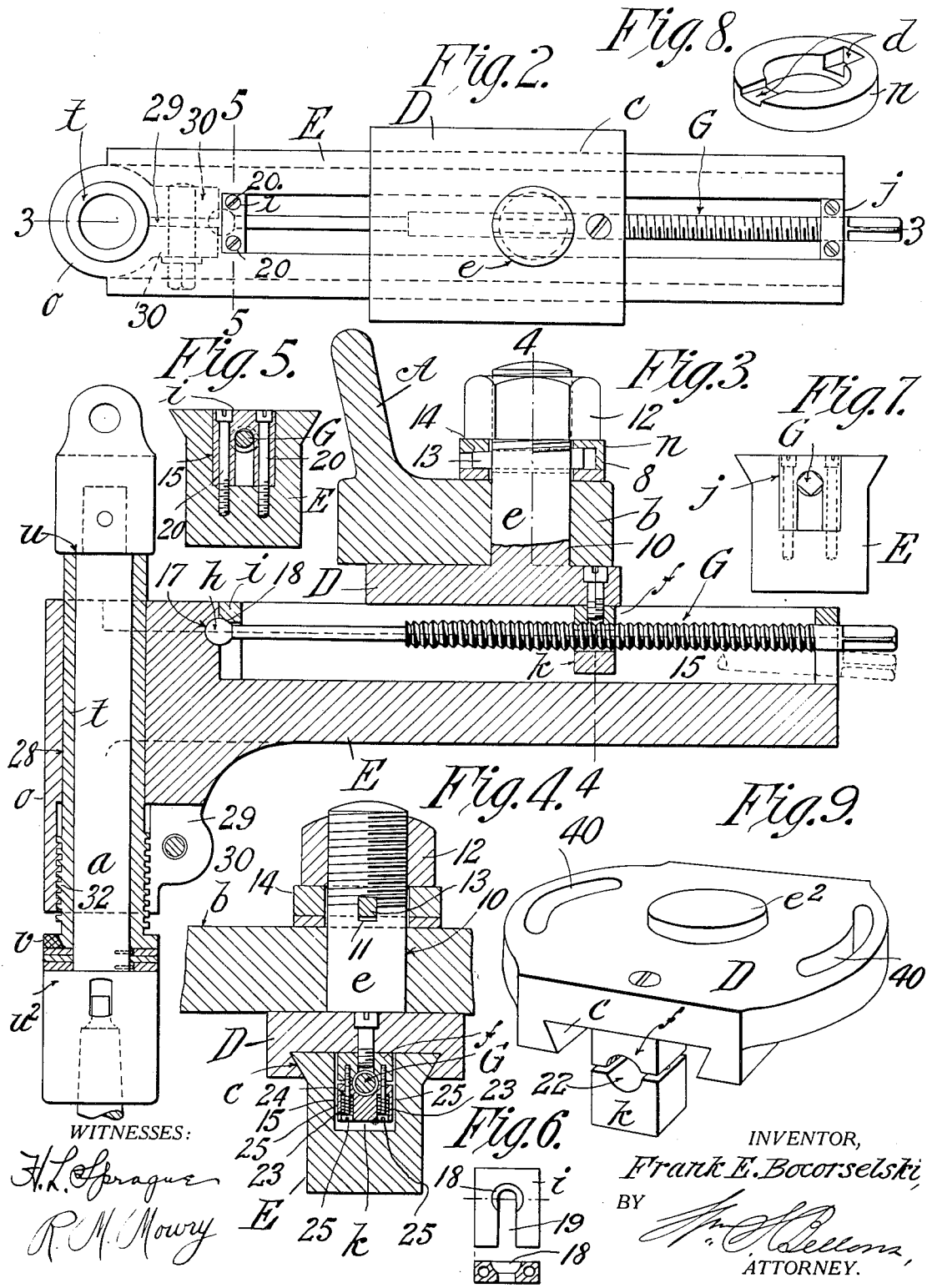

UNITED STATES PATENT OFFICE.

FRANK E. BOCORSELSKI, OF SPRINGFIELD, MASSACHUSETTS.

METAL-WORKING MACHINE.

No. 904,926.  Specification of Letters Patent.  Patented Nov. 24, 1908.

Application filed March 23, 1908. Serial No. 422,773.

*To all whom it may concern:*

Be it known that I, FRANK E. BOCORSELSKI, a citizen of the United States of America, and resident of Springfield, in the county of Hampden and State of Massachusetts, have invented certain new and useful Improvements in Metal-Working Machines, of which the following is a full, clear, and exact description.

This invention applicable for incorporation in metal working machines comprises the combination with a member having a slideway and provided with a nut segment within, and narrower than the said slideway, of a segment member movably engaged within said slideway constructed with a marginal opening and straddling about said nut segment, a screw shaft having by one end portion thereof such character of engagement with the second named member whereby it is both rotative and capable of swinging relatively thereto, but relatively immovable, a block having a non threaded semicircular recess accommodated in the longitudinal opening in the said second member and having spring means associated therewith, and with said nut segment for yieldingly and normally forcing the shaft to screw engagement with the nut segment.

By the provision of means such as just above set forth, one of the members which may be a tool carrying arm, may be moved for considerable distances for bringing it approximately to its working adjustment without the necessity of effecting such considerable movement in a slow way through the rotation of the screw shaft; and then when the required positioning is approximated the minute adjustment of the member may be accomplished through the coaction of the screw shaft with the nut segment.

The device or mechanism contemplated by the foregoing, in a preferable embodiment thereof, includes the provision of the semi-circularly and non-threaded recessed block as a conjunctive part of the nut spring engaged or supported in proximity thereto, the segment and block with the spring or springs and means for guiding the block relatively to the segment constituting what may be termed an elastic nut.

The invention furthermore comprises the combination of a supporting head or frame on which one of the aforementioned members is rotatively adjustable while the other or tool carrying member which is slidably engaged with the rotatively adjustable member has its movements in any desired line at right angles to the axis about which the other member is rotatively adjusted.

This invention, furthermore, comprises in combination with a tool carrying arm, such for instance as that for one of the spindles of a multiple spindle drilling machine having a bore therethrough at right angles to its length, which bore has screw threads therein, of a sleeve externally screw threaded, longer than the dimension of the arm in the line of its bore, engaged and axially adjustable in and through the bore of said arm, a tool carrying spindle fitted for rotation through said sleeve, having shoulders engaging at the opposite ends of the sleeve, preventing endwise movement of the spindle relatively to the sleeve, and means for effecting a temporary binding of the interengaged threads in said bored arm and the sleeve therein, for preventing rotative and consequently an axial movement of the sleeve;—such provision being of especial value for the adjustment of any one of a series of drill spindles so that all of the drills of the series may have their working ends in a common plane, irrespective of the fact that from breakage or otherwise some of the drills may be shorter than others.

The invention furthermore consists in certain particular combinations and arrangements of parts and the constructions of some of the parts, as hereinafter described and defined in the claims.

Reference is to be had to the accompanying drawings in which the present improved devices are illustrated in their applicability to, and embodiment in, a multiple spindle drilling machine, it being here stated, however, that this is only one exemplification of the utilization of the new and improved devices which are not necessarily limited to the type of machine especially shown.

In the drawings,—Figure 1 is a side elevation of a multiple spindle drilling machine on the vertically movable head of which the present improved devices are located; Fig. 2 is a plan view of one of the tool carrying members which is capable of adjustment about a fixed vertical axis and which is also capable of an adjustment in any line radial to such axis and along a plane at right angles thereto, and in which, furthermore, the tool carrying spindle is capable of an adjustment, by improved means, along the line at right angles to the length of the rotatively and slidably adjustable member. Fig. 3 is a sectional view through a portion of the head or supporting frame of the machine and through the adjustable tool carrying arm. Fig. 4 is a vertical cross sectional view on line 4—4, Fig. 3. Fig. 5 is a vertical cross sectional view on line 5—5, Fig. 2. Fig. 6 is a face view and projected horizontal cross section showing the detailed construction of a part to be hereinafter referred to. Fig. 7 is a view of the outer end of the tool carrying arm. Fig. 8 is an under side view of an element comprised in the arrangement shown in Fig. 3 to be hereinafter particularly referred to. Fig. 9 is a perspective view showing the combination of rotatively adjustable member and elastic nut carried thereby, such rotative member being represented as of a somewhat modified design from that shown in Fig. 3.

I will now proceed to describe the present improvements as applied on the vertically movable head of a multiple spindle drill, it being stated, however, that the same are in whole or in part adapted for advantageous use in other situations.

In the drawings, in Fig. 1, A represents the vertically movable head of a multiple spindle drill having supporting and vertically feeding means, not necessary to here describe, nor is it considered necessary to particularly describe the means for driving several drill spindles $a$ $a$ through the flexible or universal jointed shafts $a^2$ by inclosed gearing in the upper part of the head, to which gearing rotary movement is transmitted by the shaft B driven from a suitable source of power, as, for instance, the electric motor C.

The head is constructed at its lower portion with a circular flange like part $b$ sustained on the under side of which are the tool carrying arms E which are variously adjustable so that the drills or other tools carried thereby may be positioned in any desired arrangement one to another, and either close to, or remote from, the axis of the head A.

The tool carrying arm E is not directly supported by or sustained from the head A, but it has a supporting and slidable engagement with the head D that is sustained by and at the under side of the flange $b$ of the head and is rotative relatively thereto. This head D has a slideway $c$ therethrough of dovetail form from end to end thereof, and downwardly opening, adapted to which is a corresponding dovetail formation of the tool carrying member E, which is slidably engaged through such member D, and said member D has an upstanding affixed stud or trunnion $e$ engaged upwardly through and beyond a circular opening 10 therefor in the head portion $b$ and has a nut 12 engaged with the upper screw threaded extremity thereof for sustaining the member D on the under side of the portion $b$ and for locking it in its rotative adjustment.

A key or pin 13 in a peculiarly constructed washer 14 is interposed between the nut in the upper side of the supporting part $b$ for an advantage to be hereinafter referred to.

The member D is provided with a nut segment, or "half nut" $f$ within said slideway $c$, such nut segment being affixed as a rigid part of the member and narrower than the dovetail way therethrough.

The tool carrying member E is constructed with a longitudinal opening 15, here shown as in the form of a groove, and it straddles by said nut segment in the manner shown in Fig. 4.

G represents a screw shaft having by an end portion thereof such a character of engagement with the tool carrying member E whereby it is both rotative and capable of a swinging movement relatively to said member E, but incapable of any endwise movement. This screw shaft as specifically shown has its end made in the form of a ball $h$, and engaged or sunk for half its bulk in a semi-cylindrical cavity 17 formed in the end wall of longitudinal groove or opening 15; and the ball ended screw shaft is confined, and the ball-and-socket engagement perfected by the provision of a plate or block $i$ having at its inner side a partially cylindrical cavity 18 and a recess 19 leading through to the lower edge of the block, this block being secured with its cavity in opposed relation to the cavity 17 and with its portions at either side of said recess in a straddling relation to the portion of the screw shaft adjacent its ball end. The confinement of the said block or plate in its place is made by the screws 20 passing from the upper edge of the block downwardly through and within the thickness of the same and into the base of the groove 15 in the member E.

The outer or further end of the screw shaft projects beyond the end of the member E and is straddled by a recessed plate or block $j$ similar in form and in mode of connection to the one $i$; and the protruding end of the screw shaft is of squared or other suitable form whereby it becomes convenient to secure the rotation thereof.

$k$ represents a block accommodated in the longitudinal opening in the tool carrying member E, the same having a semi-cylindrical recess 22 therein, which is plain or non-threaded and is normally positioned against the screw shaft and opposed to the nut segment $f$; and means are provided for yieldingly forcing such semi-circular recessed block $k$ towards the nut segment for normally maintaining the screw shaft in its properly swung position whereby it is in screw-engagement with the threads of such segment. As a means for spring pressing the block *k* towards the nut segment and for guiding it with straight line movements, structural features and provisions will be observed as represented in Fig. 4, wherein it is seen that the block *k* has parallel bores 23, 23, therethrough, each made of two diameters whereby seat shoulders 24 are formed, and headed screws 25 are by their shanks disposed within and extended through said bores of the block *k* and have screw engagements into the nut segment whereby they become, to all intents and purposes, depending rigid members of the latter; and spiral springs 25 are interposed, under compression, between the aforementioned seat shoulders 24 and the heads of the screws.

The member D having been positioned properly in its rotative adjustment and held rigidly to the supporting portion *b* of the frame, the further positioning and adjustment of the tool carried by the member E will be accomplished, when a considerable traversing movement of such member is required, by slightly downwardly swinging the screw shaft G, freeing the member E by which it is bodily carried for its longitudinal movement horizontally and in any line as predetermined until the drill spindle or tool is approximately in its proper position for work, and then by permitting the screw shaft to be spring pressed by the block *k*,—which as will be seen is in substance a member of an elastic nut,—the minute or fine adjustment may be perfected by slightly turning the shaft. Inasmuch as the combined members D and E and the parts carried thereby in large drilling machines are quite heavy, and it is desirable at the time of removing the nut 12 preparatory to dismantling the parts, as is sometimes desirable for various reasons, that the said slide member and tool carrying arm may not drop down from the support *b*, I have provided the tapered key or pin 13 for crosswise engagement through the aperture 11 in the upstanding stud *e*, the ends of such key or pin projecting beyond the opposite sides of the stud, and the protruding ends of this key are inclosed within a transverse recess 9 in a washer *m* which surrounds the stud below the base of the nut, said recess having a wall 8 at its one end adjacent the larger end of the key, preventing, in case of loosening of the key, the endwise displacement thereof from its engagement shown.

The tool carrying arm E is constructed at its inner or tool carrying end with a transversely elongated boss or knee *o* having a bore 28 therethrough at right angles to the length of the arm, the said bore being screw threaded in the lower or boss extended portion thereof, said boss extension having a split 29 along a line parallel with its axis whereby it is diametrically expansible and contractible and provided at such split part with slightly separated opposed, outwardly extending ears 30, 30, coacting with which is a screw for binding them together.

A sleeve *t* having external screw threads 32 at a portion thereof, and said sleeve being longer than the dimension of the boss provided arm in the line of its bore, is engaged through, and axially adjustable in the bore of said arm by reason of its screw thread engagement.

The tool carrying spindle is fitted for rotation through said sleeve, and it has shoulders $u$, $u^2$, engaging at the opposite ends of said sleeve, absolutely preventing endwise movement of the spindle relatively to the sleeve.

The sleeve has at its lower end portion below the lower end of the boss *o*, and below the screw threads 32 formed on the sleeve, a knurled flange enlargement *v*, by means of which the sleeve may be turned,—when permitted by the loosening of the means before mentioned for maintaining the screw threads in binding engagement,—by which turning of the sleeve the vertical adjustment of the drill spindle is most conveniently accomplished.

I may construct the member D which has the downwardly opening pivotal way therethrough, and which carries the elastic nut, and one segment of which is plain or unthreaded, with a boss or trunnion $e^2$ as shown in Fig. 9, which engages in a hole therefor opening at the under side of the support *b* for centering the member and confining the same in its rotative adjustments by clamping screws and bolts, the shanks of the screws, as understood, engaging through the arc shaped slots 40, 40 in the plate-like upper portion of the member D, but this is a modification in design only of the means comprising the considerable upwardly extended stud *d* adapted for the screw engagement therewith of the clamping nut.

I claim:—

1. The combination of two members, one of which is slidable relatively to the other, one member being provided with a nut-segment, a screw-shaft having by one end portion thereof an engagement with the other member making it both rotative and capable of swinging, but endwise immovable relatively to such member, and a spring pressed part for yieldingly maintaining said screw-shaft in its removable engagement with the threads of said nut segment.

2. The combination with a member having a slide way and provided with a nut segment within, and narrower than, said slideway, of a second member movably engaged within said slideway, constructed with a longitudinal opening and straddling about said nut segment, a screw shaft having by one end portion thereof an engagement with the second named member for making it both rotative and capable of swinging relatively thereto, and a semi-circularly recessed block, accommodated in the longitudinal opening in said second member, said block having spring means associated therewith for yieldingly and normally forcing the shaft to screw engagement with said nut segment.

3. The combination with a member provided with a nut segment, of a second member slidable along the first member and provided with a screw shaft having an engagement with such member, making it rotatable, and capable of a swinging movement, but endwise immovable, relatively to such member, and a saddle block spring pressed transversely towards the axis of the shaft and engaging the latter for normally maintaining it engaged with said nut segment.

4. The combination of two members one of which is slidable relatively to the other, one of said members being provided with a nut segment, a screw shaft having an engagement with the other member making it rotatable, and capable of a swinging movement relatively thereto, a block having a semi-cylindrical recess in a side thereof, opposed to the threaded cavity in the nut segment, and adapted for engagement with an intermediate portion of the screw shaft and means for yieldingly supporting the saddle block from the nut segment.

5. The combination of two members, one of which has a dovetail slideway and provided with a nut segment therein, and the other member being slidably fitted in the dovetail way of the first member, and constructed with a longitudinal groove with a wall at one end thereof, a screw shaft having an engagement with the groove end wall of the second member, rendering it rotatable, and capable of a swinging movement, but endwise immovable relatively to such member, a block having a semi-cylindrical recess in a side thereof opposed to the threaded cavity in the nut segment, and adapted for engagement with an intermediate portion of the screw shaft, means interengaged between the nut segment and said block for guiding the latter in its movements away from and towards the block, and one or more springs sustained by the nut segment and holding said block yieldingly in its proximity thereto.

6. The combination of two members, one of which has a dovetail slideway and provided with a nut segment therein, and the other member being slidably fitted in the dovetail way of the first member, and constructed with a longitudinal groove with a wall at one end thereof, a screw shaft having an engagement with the groove end wall of the second member, rendering it rotatable, and capable of a swinging movement, but endwise immovable relatively to such member, a block having a semi-cylindrical recess in a side thereof opposed to the threaded cavity in the nut segment, adapted for engagement with an intermediate portion of the screw shaft, and having parallel bores therethrough, each of two diameters whereby seat-shoulders are formed thereby, headed screws, the shanks of which are passed through said bores of the block and with screw engagements into the nut segment, and spiral springs in compression in said bores between the seat-shoulders and the threads of the screws.

7. The combination with a supporting head having a vertical hole therethrough, of a member, for supporting the tool carrying arm, sustained at the underside of and rotatively adjustable relatively to said head, provided with a fixed upstanding stud or trunnion projecting upwardly through the hole in and beyond the upper side of said head having its extremity screw threaded and provided with a transverse aperture therethrough, a tapered pin engaged through said transverse aperture of the stud, having by its side a crowding engagement against the adjacent upper face of the head, a washer, adapted to surround said stud, having a recess in its under side for the accommodation of said tapered pin, and having a stop or wall at one end thereof to prevent endwise displacement of the pin, and a nut engaging the extremity of the stud and adapted to be downwardly set against said recessed washer.

8. The combination with an arm having a bore therethrough at right angles to its length, said bore having screw threads therein, of a sleeve externally screw threaded, engaged through and axially adjustable in the bore of said arm, and having at one end portion thereof a knurled flange enlargement, a tool carrying spindle fitted for rotation through said sleeve having shoulders engaging at the opposite ends of said sleeve and preventing endwise movement of the spindle relatively to the sleeve, and means for effecting a temporary binding of the interengaged threads in said bored arm and the sleeve therein, for preventing rotative movement of the sleeve.

9. The combination with an arm constructed with a transversely elongated boss having a bore therethrough at right angles to the length of the arm, said bore having screw threads in the boss-extended portion thereof, and said boss extension being split along a line parallel with its axis, and having outwardly extended ears, and means coacting therewith for drawing them together, of a sleeve externally screw threaded at a portion thereof and longer than the dimension of the boss provided arm in the line of its bore, engaged through and axially adjustable in the bore of said arm, a tool-carrying spindle fitted for rotation through said sleeve, having shoulders engaging at the opposite ends of the sleeve, preventing endwise movement of the spindle relatively to the sleeve, and means for rotatively driving the spindle.

Signed by me at Springfield, Mass., in presence of two subscribing witnesses.

FRANK E. BOCORSELSKI.

Witnesses:
G. R. DRISCOLL,
W. S. BELLOWS.